United States Patent
Zwollo et al.

(10) Patent No.: US 9,063,031 B2
(45) Date of Patent: Jun. 23, 2015

(54) PRESSURE-MEASURING PLUG FOR A COMBUSTION ENGINE

(71) Applicants: Cris Ruis Zwollo, Enschede (NL); Serge Groenhuijzen, Borne (NL); Marc Borgers, Enschede (NL)

(72) Inventors: Cris Ruis Zwollo, Enschede (NL); Serge Groenhuijzen, Borne (NL); Marc Borgers, Enschede (NL)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 14/077,673

(22) Filed: Nov. 12, 2013

(65) Prior Publication Data

US 2014/0130586 A1 May 15, 2014

(30) Foreign Application Priority Data

Nov. 12, 2012 (EP) .................................... 12192285

(51) Int. Cl.
*G01M 15/08* (2006.01)
*G01L 23/18* (2006.01)
*F02B 77/08* (2006.01)

(52) U.S. Cl.
CPC ............ *G01M 15/08* (2013.01); *Y10T 29/4973* (2015.01); *F02B 77/085* (2013.01); *G01L 23/18* (2013.01)

(58) Field of Classification Search
CPC ....... G01L 23/10; G01L 23/18; G01M 15/08; F23Q 2007/002; F02P 19/028; F02D 35/023
USPC .......................................... 73/114.21, 114.19
See application file for complete search history.

(56) References Cited

U.S. PATENT DOCUMENTS

| | | | | |
|---|---|---|---|---|
| 6,204,594 B1 * | 3/2001 | Ingham | ......................... | 313/141 |
| 6,411,038 B2 * | 6/2002 | Murai et al. | .................... | 315/55 |
| 6,539,787 B1 * | 4/2003 | Murai et al. | ............... | 73/114.21 |
| 7,114,396 B2 * | 10/2006 | Oda et al. | ......................... | 73/715 |
| 7,302,855 B2 * | 12/2007 | Oda | ............... | 73/756 |
| 8,250,909 B2 * | 8/2012 | Kern et al. | ................. | 73/114.16 |
| 8,297,115 B2 * | 10/2012 | Borgers et al. | ............. | 73/114.19 |
| 2001/0015402 A1 * | 8/2001 | Murai et al. | .................. | 248/554 |
| 2006/0090566 A1 * | 5/2006 | Oda | ................. | 73/715 |
| 2006/0123887 A1 * | 6/2006 | Dordet | ......................... | 73/35.12 |
| 2009/0320576 A1 * | 12/2009 | Borgers et al. | ............. | 73/114.18 |
| 2014/0130585 A1 * | 5/2014 | Borgers et al. | ............. | 73/114.18 |

* cited by examiner

*Primary Examiner* — Freddie Kirkland, III
(74) *Attorney, Agent, or Firm* — Chapin IP Law, LLC

(57) ABSTRACT

Disclosed is a pressure-measuring plug for a combustion engine. The pressure-measuring plug comprises a plug body and a ring-shaped sensing structure. The plug body comprises an external thread for mounting the plug body into a cylinder head of the combustion engine. The ring-shaped sensing structure comprises an outer section and an inner core. A proximal end of the plug body is attached to the outer section. The inner core comprises a through hole for receiving a rod-shaped element. The ring-shaped sensing structure allows the inner core to move relatively to the outer section along a cylinder axis of the ring-shaped sensing structure. The inner core further comprises an internal thread for mounting in the through hole a rod-shaped element with an external thread.

22 Claims, 2 Drawing Sheets

PRESSURE-MEASURING PLUG FOR A COMBUSTION ENGINE

TECHNICAL FIELD

The invention relates to a pressure-measuring plug for a combustion engine with a plug body comprising an external thread for mounting the plug body into a cylinder head of the combustion engine and a ring-shaped sensing structure comprising a through hole for receiving a rod-shaped element. The ring-shaped sensing structure allows the inner core to move relatively to the outer section along a cylinder axis of the ring-shaped sensing structure. More particularly, the invention relates to a piezo-resistive pressure-measuring plug for a combustion engine.

BACKGROUND ART

Advanced combustion strategies for gasoline engines in the future depend on the existence of accurate pressure feedback from each combustion cylinder during the entire cycle (compression-combustion-exhaust cycle). These strategies may or may not include Homogeneous Charge Compression Ignition (HCCI) combustion, and can result in high pressure release rates which require fast and accurate pressure response. Placement of a sensor inside the combustion chamber requires drilling an extra hole in the engine's head. By using one hole for two functions, extra costs and other practical issues faced when drilling an extra hole in the engine's head can be avoided.

A pressure-measuring plug provided with an additional function is known from EP1790964A1. The plug comprises a ring-shaped sensing structure with an outer section and an inner core. A proximal end of the plug body is attached to the outer section. The inner core comprises a through hole for receiving a rod-shaped element. The ring-shaped sensing structure allows the inner core to move relatively to the outer section along a cylinder axis of the ring-shaped sensing structure when a pressure force is acting on the rod-shaped element. However, the pressure-measuring plug is not used for mounting in a cylinder head of a combustion engine.

EP2138819A1 and EP2444786A1 disclose a piezo-resistive pressure-measuring plug for a combustion engine for measuring a pressure. The piezo-resistive pressure-measuring plug comprises a plug body for insertion into a cylinder of the combustion engine, a rod that is arranged in the plug body, a sensing structure comprising a piezo-resistive element. The sensing structure is arranged between the rod and the plug body in such a way that the rod transmits the pressure in the combustion chamber of the cylinder to the sensing structure due to the pressure in the combustion chamber. A pressure change leads to an axial motion of the rod relative to the plug body so as to apply a force to the sensing structure. As the sensing structure is integrated in the plug body, the dimension of the hole in the sensing structure is limited.

Until now, spark plugs incorporating a pressure sensor have suffered from hysteresis, lack of sealing and sensitivity to external influences such as temperature.

SUMMARY OF INVENTION

It is an object of the present invention to provide an improved pressure-measuring plug for receiving a rod-shaped element in the through hole of the sensing structure. Another object of the invention to provide a pressure measuring plug which is at least one of: reliable, cheaper to manufacture, long lasting and/or robust to harsh pressure media, withstanding the high temperature and vibration typical of an internal combustion engine.

According to a first aspect of the invention, this object is achieved by a pressure-measuring plug having the features of claim 1. Advantageous embodiments and further ways of carrying out the invention may be attained by the measures mentioned in the dependent claims.

A pressure-measuring plug according to the invention is characterized in that the inner core comprises an internal thread for mounting in the through hole a rod-shaped element with an external thread.

In all known solutions to wherein a pressure sensor is incorporated in a spark plug, the form one unit. When one of the functionalities is malfunctioning, the whole component has to be replaced. This is not a problem when the components for both functions have a similar product lifetime. However, internal tests have shown that the product lifetime of the spark plug components differs significantly from the product lifetime of the pressure sensor components. The features of the new pressure-measuring plug provide a plug structure which allows one to assemble/disassemble easily a pressure-measuring plug with rod-shaped element providing the plug with a second function. Some but not limited examples of the second function are: a spark plug function, temperature sensor, flow sensor, glow plug function. Another advantage is that one type of pressure-measuring plug could be easily combined with different types of spark plugs or functions. Only the interfacing between pressure-measuring plug and rod-shaped element has to be standardized. The pressure-measuring plug according to the invention does not require that the sensor is integrated in the spark plug, but at the same time does not require an extra hole in the engine head. The pressure-measuring plug is placed inside the existing spark plug opening in the engine head. The plug has an internal thread that is used to mount a spark plug in the pressure-measuring plug. The steel body of the sensor serves as the grounding for the spark plug, and as such there is no direct contact between the spark plug and the engine head. The fact that the pressure sensor is not compressed between the spark plug and the engine head like in U.S. Pat. No. 8,196,459 allows for a hysteresis and stress free solution.

In an embodiment, the pressure-measuring plug is configured to receive the rod-shaped element when the plug is mounted into the cylinder head. This feature provides a plug structure which allows one to replace the spark plug component without removing the pressure-measuring plug from the engine head.

In an embodiment, the external thread has a first cylinder axis and the internal thread has second cylinder axis which is aligned with the first cylinder axis. These features provide a construction having parts that are rotationally symmetric. The parts could be manufactured by a metal cutting process.

In an embodiment, in axial direction the external thread of the plug body and the internal thread of the sensing structure do not overlap. This feature allows reducing the diameter of the pressure-measuring plug.

In an embodiment, the plug body comprises a base part and a threaded part. The ring-shaped sensing structure is attached to an end of the base part and an opposite end of the base part is positioned in the threaded part. These features provide parts with less complex structure to assemble a plug body with a complex structure.

In an embodiment, the pressure-measuring plug further comprises a cylindrical body part which is at one end attached to the inner core. The cylindrical body part extends at least partially in the plug body. An inner surface of the cylindrical body part comprises a sealing profile for providing a sealing between the pressure-measuring plug and the rod-shaped element. These features provide a robust sealing of the gasses in the combustion chamber. In a further embodiment, the sealing profile is conical. In an alternative embodiment, the cylindrical body part is integral part of the inner core.

In an embodiment, the pressure-measuring plug further comprises an annular membrane. A first rim of the annular membrane is welded to the plug body and a second rim of the annular membrane is welded to the cylindrical body part to provide a sealing between the cylindrical body part and the plug body. The membrane is a barrier to protect the sensor electronics from the heat of the combustion gases and also as a temperature regulator for the rod-shaped element, i.e. spark plug, mounted in the pressure-measuring plug. In a particular embodiment, the annular membrane is located in the plug body.

A spark plug which is an embodiment of the rod-shaped element has operating characteristics which depend on temperature. In a further embodiment of the pressure-measuring plug, the annular membrane has a predefined distance from a distal end of the plug body to provide the rod-shaped element in use the optimal operating temperature. The distal end is the part of the body part facing the combustion chamber. This feature provides a combination of spark plug and pressure sensor with optimal performance.

In an embodiment, along a plug axis of the pressure-measuring plug, the sealing profile is located between the ring-shaped sensing structure and the annular membrane. This feature provides a robust plug with minimal diameter.

In an alternative embodiment, the pressure-measuring plug further comprises an O-ring which provides a sealing between the rod-like element and the cylindrical body part. In this embodiment the sealing profile of both the cylindrical body part and rod-like element is replaced by an O-ring.

In a second aspect there is provided a method of replacing a spark plug of a combustion engine. The spark plug is screwed out of a pressure-measuring plug according to any of the previous embodiment which is mounted into a cylinder head of the combustion engine. Subsequently, another spark plug is screwed into the pressure-measuring plug.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF EMBODIMENTS

Figures 1, 2, 3:
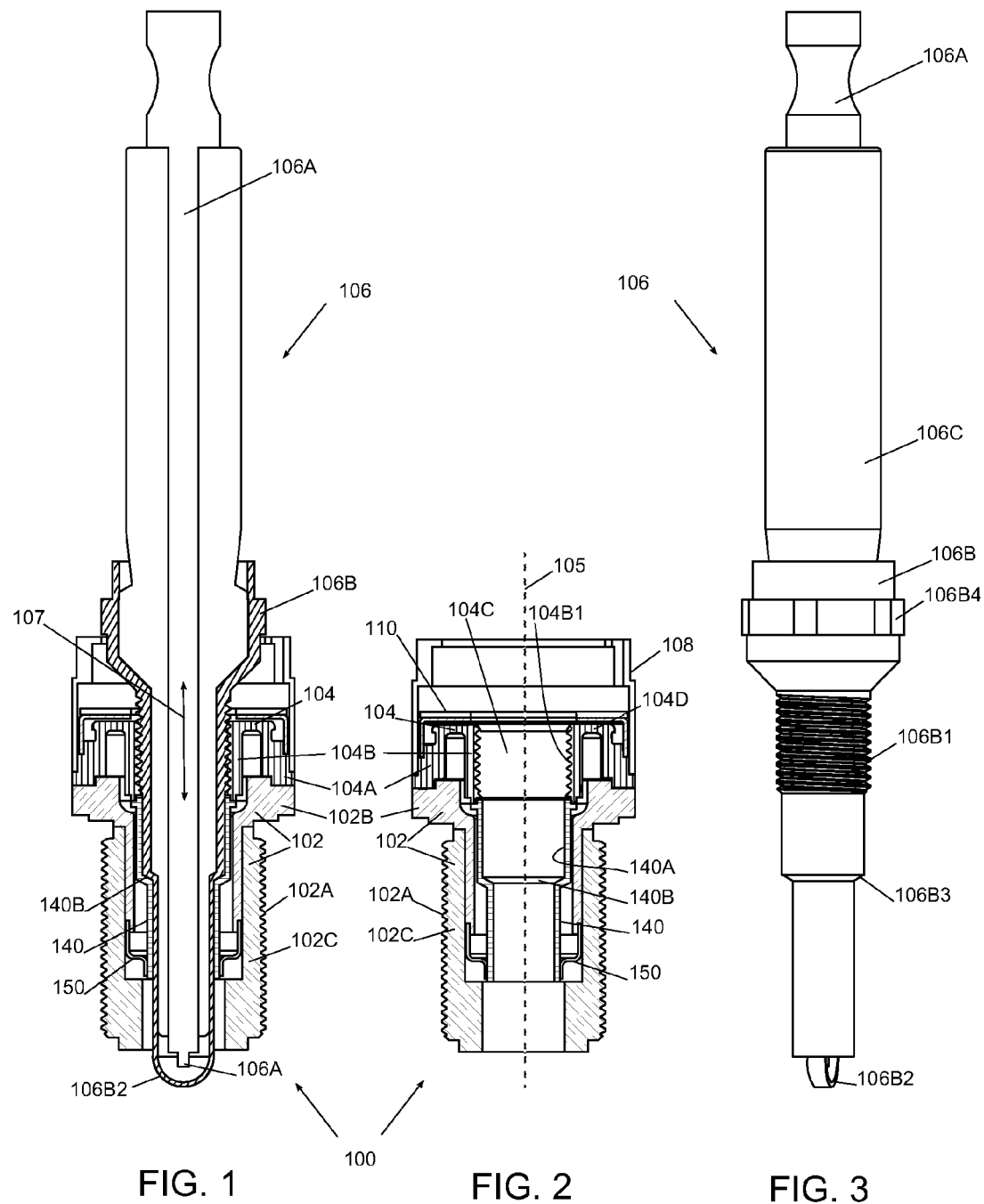
FIG. 1 shows schematically a sectional view of a first embodiment of a pressure-measuring plug provided with a spark plug.
FIG. 2 shows schematically a sectional view of the first embodiment of the pressure-measuring plug.
FIG. 3 shows schematically a side view of a spark plug for use in the first embodiment.

FIGS. 1 and 2 show schematically a sectional view of a first embodiment of a pressure-measuring plug 100 for a combustion engine. The pressure-measuring plug 100 comprises a plug body 102 and a ring-shaped sensing structure 104. A spark plug 106 is removably positioned in the pressure-measuring plug 100. The pressure-measuring plug 100 further comprises a housing 108 which is provided with a hexagonal periphery to enable the mounting of the pressure-measuring device with a wrench.

The plug body 102 comprises an external thread 102A for mounting the plug body 102 into a cylinder head of a combustion engine. The plug body 102 comprises a base part 102B and a threaded part 102C which comprises the external thread. A part of the base part 102B extends in the through hole of the threaded body part 102C.

The ring-shaped sensing structure 104 comprises an outer section 104A, an inner core 104B and a diaphragm 104D. The diaphragm 104D connects movably the inner core 104B to the outer section 104A. The outer section 104A is attached to a proximal end of the plug body 102. In this embodiment, the proximal end is part of the base part 102B. Via the threaded plug body 102 the outer section 104A could rigidly be mounted in a hole of an engine head. The outer diameter of the ring-shaped sensing structure 104 is larger than the diameter of the thread of the body part 102. The inner core 104B comprising a through hole 104C for receiving a rod-shaped element 106. The through hole 104C of the ring-shaped sensing structure 104 has a cylinder axis 105 which is aligned with a cylinder axis of the threaded body part 102. The inner core 104B comprises an internal thread 104B1 for placement of a rod-shaped element. In FIG. 1, a rod-shaped element 106 in the form of a spark plug is mounted in the through hole 104C of the inner core 104B. The rod-shaped element 106 comprises an external thread 106B1 as shown in FIG. 3. The rod-shaped element 106 further comprises a hexagonal periphery 106B4.

The pressure-measuring plug further comprises a cylindrical body part 140. At one end the cylindrical body part 140 is rigidly attached by welding to the inner core 104B. The cylindrical body part 140 extends at least partially in the threaded body part 102C of plug body 102. An inner surface 140A of the cylindrical body part 140 comprises a sealing profile 140B. The sealing profile 140B has a conical shape and provides a pressure seal area. When a rod-shaped element 106 with a corresponding sealing profile is screwed in the pressure-measuring plug the conical surfaces are pressed together and provide a high pressure seal. It should be noted that the ring-shaped sensing structure 104 and cylindrical body part 140 could be made from one piece of material.

The pressure-measuring plug 100 further comprises an annular membrane 150. The annular membrane 150 protects the diaphragm 104D from the combustion gasses in the cylinder of the combustion engine. A first rim of the annular membrane is welded to the plug body 102. A second rim of the annular membrane is welded to the cylindrical body part 140. In this way a sealing between the cylindrical body part and the plug body is provided.

The external thread 102A of the plug body 102 has a first cylinder axis and the internal thread 104B1 of the pressure sensing structure 104 has second cylinder axis. In the first embodiment the first cylinder axis and second cylinder axis are aligned. Furthermore, in axial direction the external thread (102A) and the internal thread (104B1) do not overlap. In other words, the two threads are placed axially next to each other. This construction allows reducing the diameter of the opening in the threaded body part and provides space in the threaded body part 102 for installation space for the stainless steel membrane 150. In this way, a pressure-measuring plug could be obtained with a threaded body part 102 which has dimensions corresponding to conventional spark plugs.

The annular membrane 150 is located in the plug body 102 at distance from the pressure sensing structure 104. This enables to reduce the maximum temperature of the diaphragm 104D, strain gauges attached to the diaphragm and electronics 110 located in the housing 108 of the plug 100. It has further be found that a spark plug works optimal when is has a specific operating temperature. To obtain this specific operating temperature, the location of the membrane 150 the annular membrane should have a predefined distance from a distal end, i.e. the end facing the combustion chamber, of the plug body 102. This distance defines the surface of the spark plug that is in contact with the hot combustion gasses and the surface that is "cooled" by the lower temperature of the pressure-measuring plug.

FIGS. 1 and 2 shows that along a plug axis 105 of the pressure-measuring plug, the sealing profile 140B of the cylindrical body part 140 is located between the inner core 104B of the ring-shaped sensing structure 104 and the annular membrane 150.

Figure 4:
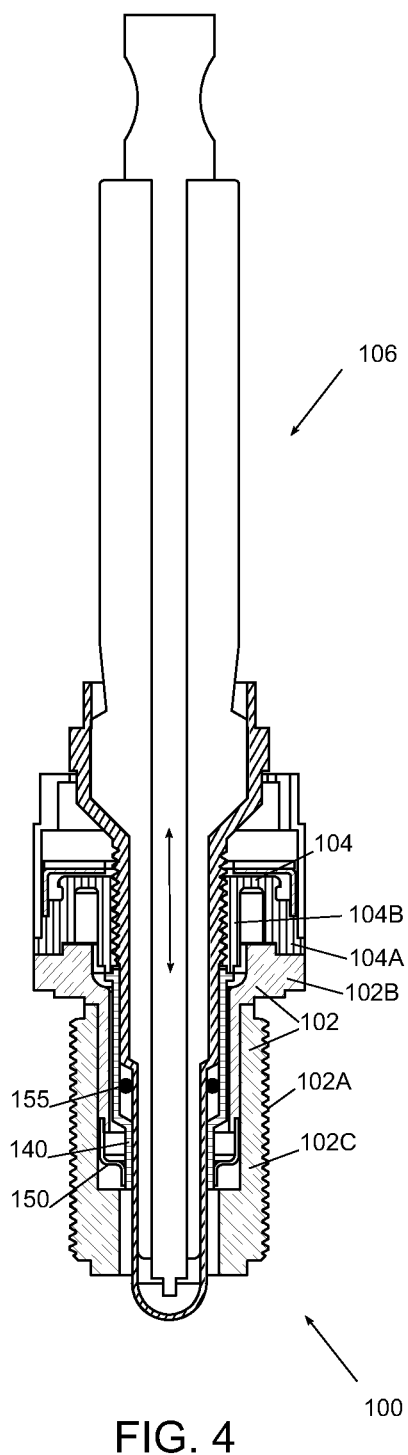
FIG. 4 shows schematically a sectional view of a second embodiment of a pressure-measuring plug provided with a spark plug.

FIG. 4 shows a sectional view of a second embodiment of the pressure-measuring plug 100. This embodiment differs from the first embodiment in that an O-ring is used to provide a sealing between the rod-shaped element 106 and the cylindrical body 140.

The pressure-measuring plug 100 functions as follows. The ring-shaped sensing structure 104 allows the inner core 104B to move relatively to the outer section 104A along the cylinder axis 105 of the ring-shaped sensing structure 104. It should be noted that the cylinder axes of all components of the pressure-measuring plug 100 and the rod-shaped element 106 coincide, therefore only one reference number 105 is used to indicate the cylinder axis of all the respective components. The diaphragm 104D between the inner core 104B and outer section 104A allows the rod-shaped element to move up and down 107 in the pressure-measuring plug under the influence of pressure changes of the combustion gasses in the combustion chamber. The movement causes a strain in the diaphragm that is the bridge between the inner core 104B and the rigid outer section 104A. The strain is measured by strain gauges (not shown) which are attached on the surface of the ring-shaped sensing structure facing away the threaded body part. The strain gauges which are piezo-resistive elements, translate the strain in the diaphragm into a resistance change. The resistance is translated into a voltage difference by means of a Wheatstone bridge. The voltage is corrected and amplified by an ASIC which is mounted on a printed circuit board 110.

A rod-shaped element in the form of a spark plug 106 comprises a central electrode 106A, an insulating core 106C and an external body 106B. The insulating core 106C, which is usually made of a ceramic material, forms an electrical insulation between the central electrode 106A and the external body 106B. The external body 106B comprises a ground electrode 106B2. The external body 106B is configured to cooperate with the ring-shaped sensing structure 104 to attach rigidly the spark plug in the through hole of the sensing structure 104 and to form a sealing to protect the electronics of the pressure-measuring plug 100 from the combustion gasses.

The through hole 104C of the pressure measuring plug 100 narrows from the inner core 104B comprising the internal thread to the end of the cylindrical body part 140 facing the combusting chamber. This allows the pressure-measuring plug to receive the rod-shaped element when the plug is mounted into a cylinder head.

The present invention does not integrate a pressure sensor and a second function such as a spark plug into one plug, but provides a construction wherein the pressure-measuring plug could be placed first inside an existing spark plug opening in the engine head. Subsequently, the internal thread of the pressure-measuring plug is used to mount a rod-shaped element performing the second function.

In case the rod-shaped element is a spark plug, the steel body parts of the pressure-measuring plug serves as the grounding of the spark plug. As such, there is no direct electrical connection between the spark plug and the engine head. The pressure-sensing structure couples electrically the external body 106B of the spark plug to the threaded body part 102 which is in electrical contact with the engine head. Thus, an electrical current due to a spark flows through the pressure-sensing structure 104 and will disturb the signal generated by the strain gauges. However, as the electrical current due to the spark is very short in time and the time instant of the spark is known by the motor management system, software in the motor management system is able to eliminate the distortion due to the spark in the pressure signal generated by the pressure-measuring plug and to obtain a pressure signal which is suitable to control the engine.

The fact that the sensor is not compressed between the rod-shaped element 106 and the engine head provides a hysteresis-free solution. The invention provides a stress-free assembly of both the pressure-measuring plug and the rod-like element. Furthermore, it provides a construction which is less sensitive to the high temperature of the combustion gasses. The construction allows for normal placement of the spark plug without having to exchange the pressure-measuring plug.

A method of replacing a spark plug of a combustion engine comprises screwing the spark plug out of a pressure-measuring plug described above which plug is mounted into a cylinder head of the combustion engine; and, screwing a new spark plug into the pressure-measuring plug.

In the description above, a rod-shaped element in the form of a spark plug is described in combination with the pressure-measuring plug. It might be clear that other rod-shaped elements could be used in combination with the pressure-measuring plug. Some other examples of rod-shaped elements are: a glow plug, a temperature sensor in the form of a plug, a flow sensor in the form of a plug and a dummy plug.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the idea of the invention.

The invention claimed is:

1. A pressure-measuring plug for a combustion engine comprising:
    a plug body comprising an external thread for mounting the plug body into a cylinder head of the combustion engine;
    a ring-shaped sensing structure comprising an outer section and an inner core, a proximal end of the plug body being attached to the outer section, the inner core comprising a through hole for receiving a rod-shaped element, wherein the ring-shaped sensing structure allows the inner core to move relatively to the outer section along a cylinder axis of the ring-shaped sensing structure;
    the inner core comprising an internal thread for mounting in the through hole a rod-shaped element with an external thread.

2. The pressure-measuring plug according to claim 1, wherein the pressure-measuring plug is configured to receive the rod-shaped element when the plug is mounted into the cylinder head.

3. The pressure-measuring plug according to claim 2, wherein the rod-shaped element is a spark plug.

4. The pressure-measuring plug according to claim 3, wherein the external thread has a first cylinder axis and the internal thread has second cylinder axis which is aligned with the first cylinder axis.

5. The pressure-measuring plug according to claim 4, wherein the plug body comprises a base part and a threaded part, the ring-shaped sensing structure is attached to an end of the base part; an opposite end of the base part is positioned in the threaded part.

6. The pressure-measuring plug according to claim 4, wherein the plug further comprises a cylindrical body part which is at one end attached to the inner core, the cylindrical body part extends at least partially in the plug body and an inner surface of the cylindrical body part comprises a sealing profile for providing a sealing between the pressure-measuring plug and the rod-shaped element.

7. The pressure-measuring plug according to claim 3, wherein in axial direction the external thread and the internal thread do not overlap.

8. The pressure-measuring plug according to claim 2, wherein the plug body comprises a base part and a threaded part, the ring-shaped sensing structure is attached to an end of the base part; an opposite end of the base part is positioned in the threaded part.

9. The pressure-measuring plug according to claim 2, wherein the plug further comprises a cylindrical body part which is at one end attached to the inner core, the cylindrical body part extends at least partially in the plug body and an inner surface of the cylindrical body part comprises a sealing profile for providing a sealing between the pressure-measuring plug and the rod-shaped element.

10. The pressure-measuring plug according to claim 1, wherein the plug body comprises a base part and a threaded part, the ring-shaped sensing structure is attached to an end of the base part; an opposite end of the base part is positioned in the threaded part.

11. The pressure-measuring plug according to claim 10, wherein the plug further comprises a cylindrical body part which is at one end attached to the inner core, the cylindrical body part extends at least partially in the plug body and an inner surface of the cylindrical body part comprises a sealing profile for providing a sealing between the pressure-measuring plug and the rod-shaped element.

12. The pressure-measuring plug according to claim 1, wherein the plug further comprises a cylindrical body part which is at one end attached to the inner core, the cylindrical body part extends at least partially in the plug body and an inner surface of the cylindrical body part comprises a sealing profile for providing a sealing between the pressure-measuring plug and the rod-shaped element.

13. The pressure-measuring plug according to claim 12, wherein the sealing profile is conical.

14. The pressure-measuring plug according to claim 13, wherein the pressure-measuring plug further comprises an annular membrane, a first rim of the annular membrane is welded to the plug body and a second rim of the annular membrane is welded to the cylindrical body part to provide a sealing between the cylindrical body part and the plug body.

15. The pressure-measuring plug according to claim 14, wherein the annular membrane is located in the plug body.

16. The pressure-measuring plug according to claim 15, wherein the rod-shaped element has operating characteristics which depend on temperature, wherein the annular membrane has a predefined distance from a distal end of the plug body to provide the rod-shaped element in use the optimal operating temperature.

17. The pressure-measuring plug according to claim 16, wherein along a plug axis of the pressure-measuring plug, the sealing profile is located between the ring-shaped sensing structure and the annular membrane.

18. The pressure-measuring plug according to claim 17, wherein the pressure-measuring plug further comprises an O-ring which provides a sealing between the rod-like element and the cylindrical body part.

19. The pressure-measuring plug according to claim 18, wherein the cylindrical body part is a part of the inner core.

20. The pressure-measuring plug according to claim 1 wherein the outer section, inner core and plug body are concentric with the cylinder axis for displacement of the inner core along the cylinder axis.

21. The pressure-measuring plug according to claim 1 wherein the ring shaped sensing element is responsive to a strain gauge for sensing movement in response to pressure in the cylinder head.

22. A method of replacing a spark plug of a combustion engine, comprising:
   screwing the spark plug out of a pressure-measuring plug, the pressure measuring plug further comprising:
   a plug body comprising an external thread for mounting the plug body into a cylinder head of the combustion engine;
   a ring-shaped sensing structure comprising an outer section and an inner core, a proximal end of the plug body being attached to the outer section, the inner core comprising a through hole for receiving a rod-shaped element, the ring-shaped sensing structure allowing the inner core to move relatively to the outer section along a cylinder axis of the ring-shaped sensing structure; the inner core comprising an internal thread for mounting in the through hole a rod-shaped element with an external thread, the plug being mounted into a cylinder head of the combustion engine; and,
   screwing a new spark plug into the pressure-measuring plug.

* * * * *